US008655347B2

(12) United States Patent
Lee et al.

(10) Patent No.: US 8,655,347 B2
(45) Date of Patent: Feb. 18, 2014

(54) MEASURING MACROCELL QUALITY USING FEMTOCELL

(75) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/447,414

(22) Filed: Apr. 16, 2012

(65) Prior Publication Data

US 2012/0264419 A1 Oct. 18, 2012

(30) Foreign Application Priority Data

Apr. 14, 2011 (KR) .................. 10-2011-0034853

(51) Int. Cl.
*H04W 4/00* (2009.01)
(52) U.S. Cl.
USPC ............. 455/422.1; 455/161.3; 455/452.2; 455/67.13
(58) Field of Classification Search
None
See application file for complete search history.

(56) References Cited

U.S. PATENT DOCUMENTS

| 7,796,514 | B2 | 9/2010 | Noriega |
| 8,223,683 | B2 * | 7/2012 | Czaja et al. .................. 370/315 |
| 2006/0178153 | A1 | 8/2006 | Tenny et al. |
| 2009/0238143 | A1 | 9/2009 | Mukherjee et al. |
| 2009/0286545 | A1 | 11/2009 | Yavuz et al. |
| 2010/0008324 | A1 | 1/2010 | Lee et al. |
| 2010/0015921 | A1 | 1/2010 | Yavuz et al. |
| 2010/0015978 | A1 | 1/2010 | Yoon et al. |
| 2010/0075679 | A1 | 3/2010 | Tenny et al. |
| 2010/0111022 | A1 * | 5/2010 | Chang et al. .................. 370/329 |
| 2010/0124927 | A1 * | 5/2010 | Eskicioglu et al. ........... 455/436 |
| 2010/0144338 | A1 | 6/2010 | Kim et al. |
| 2011/0003559 | A1 | 1/2011 | Morita et al. |
| 2011/0013560 | A1 | 1/2011 | Zhang et al. |
| 2011/0092214 | A1 | 4/2011 | Iwamura |
| 2011/0110520 | A1 * | 5/2011 | Ness et al. .................... 380/270 |
| 2011/0319086 | A1 * | 12/2011 | Katori .......................... 455/440 |

FOREIGN PATENT DOCUMENTS

| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |

(Continued)

*Primary Examiner* — Charles Appiah
*Assistant Examiner* — Edward Zhang
(74) *Attorney, Agent, or Firm* — IP Legal Services, LLC

(57) ABSTRACT

The disclosure is related to measuring macrocell quality of a macrocell using femtocells. A method may be provided for measuring macrocell quality of at least one macrocell using a femtocell base station. The method may include measuring, by the femtocell base station, macrocell quality of at least one macrocell based on event information, generating macrocell quality report information based on a result of the measuring, and transmitting the generated macrocell quality report information to a server through a femtocell gateway. The measuring macrocell quality may include determining whether a macrocell identifier is present in the event information, measuring the macrocell quality of a target macrocell corresponding to the mermen identifier of the event when the macrocell identifier is present in the event information, and measuring the macrocell quality of substantially all neighbor macrocells when the macrocell identifier is absent from the event information.

18 Claims, 5 Drawing Sheets

(56) References Cited

FOREIGN PATENT DOCUMENTS

| | | |
|---|---|---|
| KR | 10-2010-0029869 A | 3/2010 |
| KR | 10-2010-0060353 A | 6/2010 |
| KR | 10-2010-0066898 A | 6/2010 |
| KR | 10-2010-0092742 A | 8/2010 |
| KR | 10-2010-0126776 A | 12/2010 |
| KR | 10-2010-0126818 A | 12/2010 |
| KR | 10-2010-0133821 A | 12/2010 |
| KR | 10-2011-0030456 A | 3/2011 |
| KR | 10-2011-0030693 A | 3/2011 |
| KR | 10-2011-0099327 A | 9/2011 |
| WO | 2009/122778 A1 | 10/2009 |

* cited by examiner

MEASURING MACROCELL QUALITY USING FEMTOCELL

CROSS REFERENCE TO PRIOR APPLICATIONS

The present application claims priority under 35 U.S.C. §119 to Korean Patent Application No. 10-2011-0034853 (filed on Apr. 14, 2011), which is hereby incorporated by reference in its entirety.

FIELD OF THE INVENTION

The present invention relates to measuring macrocell quality using femtocells.

BACKGROUND OF THE INVENTION

A femtocell may be a small, wireless communication service area that is managed and controlled by a femtocell base station. The femtocell base station is designed to connect user equipment located in the femtocell to a service provider's network. The femtocell may be a home or a small business office present in a cellular system. The range of femtocell base station may be about 10 to 30 meters. The femtocell base station may allow access for about 4 to 7 user equipment devices simultaneously.

Femtocell base stations may frequently be installed at a shadow area in a macrocell. The shadow area of the macrocell denotes an area where signals of the macrocell base station become deteriorated. For example, the shadow area of the macrocell may be an inside of a building or a home. Femtocell base stations may improve overall quality of mobile communication service by providing service within these shadow areas.

As described above, femtocells may frequently overlap areas of and within a macrocell in one area. In order to efficiently manage such a heterogeneous network including femtocells and macrocells, femtocell quality and macrocell quality may be regularly measured and monitored. The femtocell quality may denote quality of a signal transmitted from a femtocell base station that is received at a device transceiver. The macrocell quality may denote quality of a signal generated and transmitted from a macrocell base station as received by user devices. The femtocell quality and the macrocell quality may be measured by measuring signal quality parameters of both a femtocell and a macrocell. For example, the signal quality parameters may be a signal-to-interference plus noise ratio (SINR) and/or a reference signal received power (RSRP). The SINR and/or RSRP femtocells and macrocells may be regularly measured and the femtocell quality and the macrocell quality may be determined based on the measurement results.

Typically, macrocell quality is measured separately from measuring femtocell quality. For example, two separated servers may be used for measuring the signal quality parameters for a macrocell and a femtocell independently. Accordingly, it may require a high cost for managing such heterogeneous network including femtocells and macrocells.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, macrocell quality and macrocell failure may be measured and monitored through femtocells.

In accordance with another aspect of the present invention, macrocell quality and femtocell quality may be measured using the same sever. in accordance with another aspect of the present invention, a maintenance cost for heterogeneous network including a femtocell and a macrocell may be reduced using a femtocell sever to measure both of femtocell quality and macrocell quality.

In accordance with another aspect of the present invention, a heterogeneous network including femtocells and a macrocell may be efficiently managed and controlled by measuring femtocell quality and macrocell quality using a femtocell system.

In accordance with an exemplary embodiment of the present invention, a method may be provided for measuring macrocell quality of at least one macrocell using a femtocell base station. The method may include measuring, by the femtocell base station, macrocell quality of at least one macrocell based on event information, generating macrocell quality report information based on a result of the measuring, and transmitting the generated macrocell quality report information to a server through a femtocell gateway.

The measuring macrocell quality may include determining whether a macrocell identifier is present in the event information, measuring the macrocell quality of a target macrocell corresponding to the macrocell identifier of the event when the macrocell identifier is present in the event information, and measuring the macrocell quality of substantially all neighbor macrocells when the macrocell identifier is absent from the event information.

For the measuring macrocell quality, at least one signal quality parameter of the at least one macrocell may be measured.

The signal quality parameter may be at least one of a signal-to-interference plus noise ratio (SINR) and a reference signal received power (RSRP).

The generating macrocell quality report information may include initiating at least one threshold value based on threshold information included in the event information, determining whether the measured macrocell quality reaches the at least one threshold value, and generating the macrocell quality report information by including the measured macrocell quality when the measured macrocell quality reaches the at least one threshold value.

The transmitting the generated macrocell quality report information may include initiating a tinier based on interval information included in the event information, and regularly transmitting the generated macrocell quality report information to the server through the femtocell gateway based on a value of the timer.

Prior to the measuring macrocell quality, the method may further include, at the server, generating the event information by including at least one of the threshold information, the interval information, and the macrocell identifier of the target macrocell, and transmitting the generated event information to the femtocell gateway.

The method may further include, at the femtocell gateway, receiving the event information from the server; determining whether the macrocell identifier of the target macrocell is present in the received event information, determining whether a femtocell identifier of a target femtocell base station capable of measuring the target macrocell is present in cell information; transmitting the event information to the target femtocell base station when the macrocell identifier is present in the event information and the femtocell identifier of the target femtocell base station is present in the cell information, and transmitting the event information to substantially all femtocell base stations coupled to the femtocell gateway when the macrocell identifier is absent in the event information and when the femtocell identifier is absent in the cell information.

Prior to the measuring macrocell quality, the method may include, at femtocell base stations coupled to the femtocell gateway, scanning and receiving signals transmitted from at least one neighbor macrocell in a listening mode, collecting the macrocell identifier of the at least one neighbor macrocell based on the received signals, generating the cell information by including the collected macrocell identifier and a femtocell identifier associated with the collected macrocell identifier, and transmitting the information to the femtocell gateway.

In accordance with another embodiment of the present invention, a femtocell base station may include a measuring unit and a transmitter. The measuring unit may be configured to measure macrocell quality of at least one macrocell based on event information and to generate macrocell quality report information based on the measuring result. The transmitter may be configured to transmit the generated macrocell quality report information to a server through a femtocell gateway.

The measuring unit may be configured to determine whether a macrocell identifier is present in the event information, to measure the macrocell quality of a target macrocell indicated by the macrocell identifier present in the event when the macrocell identifier is present in the event information, and to measure the macrocell quality of substantially all neighbor macrocells when the macrocell identifier is absent from the event information.

At least one signal quality parameter of the at least one macrocell may be measured for measuring the macrocell quality of the at least one macrocell.

The signal quality parameter may include at least one of a signal-to-interference plus noise ratio (SINR) and a reference signal received power (RSRP).

The femtocell base station may further include a threshold control unit configured to set up at least one threshold value based on threshold information included in the event information. If the measured macrocell quality reaches the at least one threshold value, the macrocell quality report information may be generated including the measured macrocell quality.

The femtocell base station may further include a timer control unit configured to initiate a timer based on interval information present in the event information. The transmitter may regularly transmit the generated macrocell quality report information to the server through the femtocell gateway based on a value of the timer.

The server may include a generator and a transmitter. The generator may be configured to generate the event information by including at least one of threshold information, interval information, and a macrocell identifier of a target macrocell. The transmitter may be configured to transmit the generated event information to the femtocell gateway.

The server may include a threshold setup unit and an interval setup unit. The threshold setup unit may be configured to set up at least one threshold value corresponding to signal quality parameters and to generate threshold information by including the set up at least one threshold value. The interval setup unit may be configured to set up a report interval and to generate interval information by including the set up report interval. The signal quality parameter may be selected and set up to be representatively measured for measuring the macrocell quality The femtocell gateway may include a receiver, a cell determination unit, and a transmitter. The receiver may be configured to receive the event information from the server and to receive cell information from femtocell base stations coupled to the femtocell gateway. The cell determination unit may be configured to determine whether the macrocell identifier of the target macrocell is included in the received event information and to determine whether a femtocell identifier of a target femtocell base station capable of measuring the target macrocell is included in the cell information. The transmitter may be configured to transmit the event information to the target femtocell base station when the macrocell identifier is present in the event information and when the femtocell identifier of the target femtocell base station is present in the cell information, and to transmit the event information to all femtocell base stations coupled to the femtocell gateway when the macrocell identifier is absent from the event information and when the femtocell identifier is absent from the cell information.

The femtocell base station may further include a collector configured to collect a macrocell identifier of the at least one neighbor macrocell and to generate the cell information by including the collected macrocell identifier and a femtocell identifier associated with the collected macrocell identifier. The transmitter may be configured to transmit the cell information to the femtocell gateway.

The receiver may be configured to scan and to receive signals transmitted from at least one neighbor macrocell in a listening mode. The collector may be configured to detect the macrocell identifier of the at least one neighbor macrocell based on the scanned signals.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF IRE INVENTION

Figure 1:
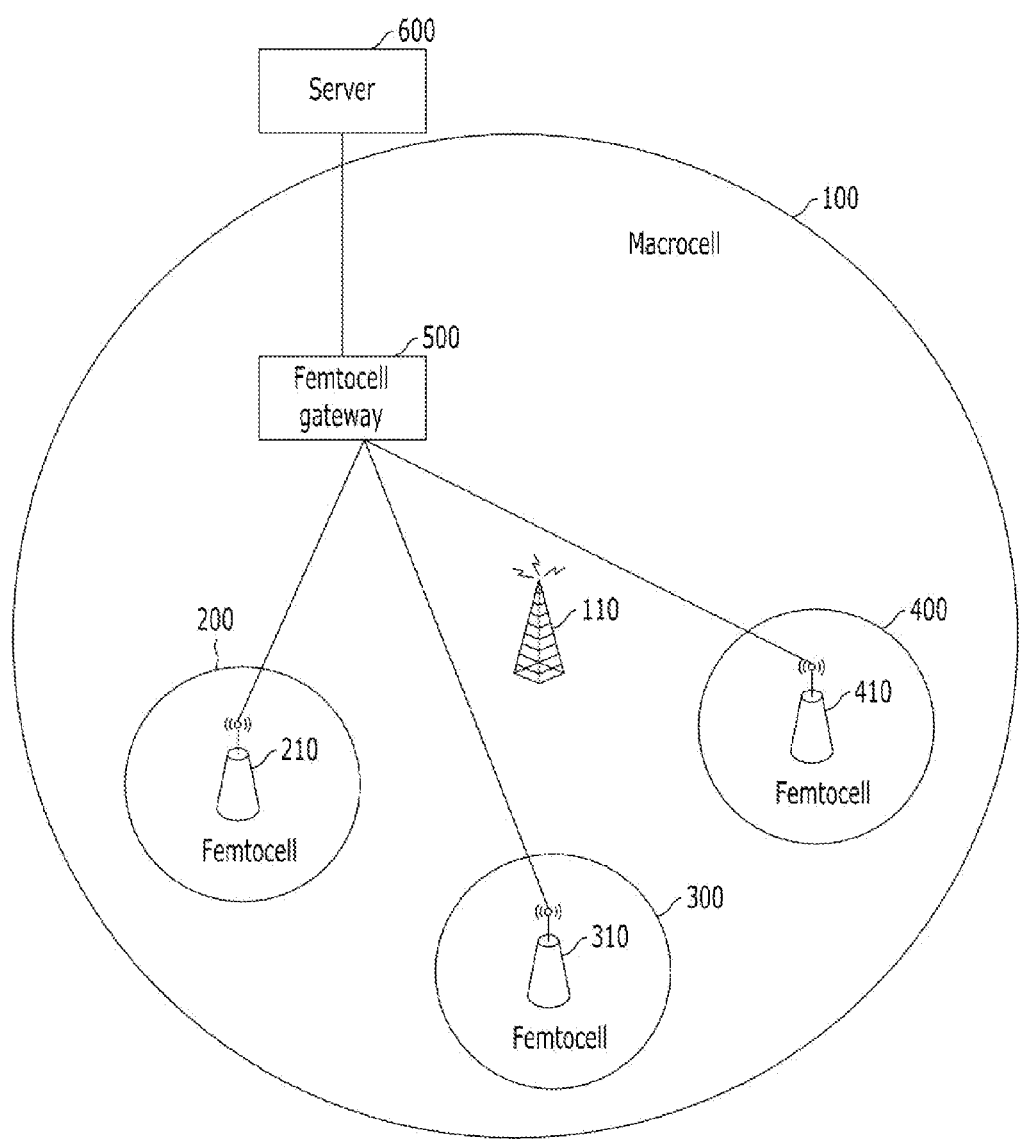
FIG. 1 shows a heterogeneous network including femtocells and a macrocell in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, macrocell quality may be monitored and measured using femtocells. Particularly, signal quality of a macrocell may be monitored and measured using a server that measures femtocell quality. Hereinafter, a system and method for measuring macrocell quality using femtocells in accordance with an embodiment of the present invention wilt be described with reference to FIG. 1.

FIG. 1 shows a heterogeneous network including femtocells and a macrocell in accordance with an embodiment of the present invention.

Referring to FIG. 1, macrocell 100 may be overlapped with a plurality of femtocells 200, 300, and 400. Macrocell base station 110 may provide a macrocell service to entities such as user equipment located in macrocell 100. Femtocell base stations 210, 310, and 410 may respectively provide a femtocell service to entities such as user equipment located in femtocells 200, 300, and 400. Femtocell gateway 500 may be coupled with at least one of femtocell base stations 210, 310, and 410. Femtocell gateway 500 may be also coupled with server 600.

In accordance with an embodiment of the present invention, femtocell base stations 210, 310, and 410 may receive event information from server 600 through femtocell gateway 500 and measure macrocell quality of at least one macrocell based on the event information. The event information may include a macrocell identifier of a target macrocell, threshold information, and interval information. Femtocell base stations 210, 310, and 410 may measure macrocell quality of a target macrocell indicated by the macrocell identifier included in the event information. For example, femtocell base stations 210, 310, and 410 may measure signal quality parameters of the target macrocell, which may be selected to represent the macrocell quality of the target macrocell. The signal quality parameters may be a signal-to-interference plus noise ratio (SINR) and/or a reference signal received power (RSRP), but the present invention is not limited thereto. The RSRP may denote power of a signal received at a femtocell base station from a macrocell base station. The SINR may denote an interference level and a noise level of a macrocell, interfered by signals from at least one neighbor femtocell.

Femtocell base stations 210, 310, and 410 may generate macrocell quality report information including the measured macrocell quality therein and transmit the macrocell quality report information to server 600 through femtocell gateway 500 based on the threshold information and the interval information included in the event information. For example, femtocell base stations 210, 310, and 410 may determine whether the measured macrocell quality exceeds a threshold value or not. When the measured macrocell quality exceeds the corresponding threshold femtocell base stations 210, 310, and 410 may regularly transmit the macrocell quality report information to server 600 through femtocell gateway 500 at a report interval set up based on the interval information.

Femtocell base stations 210, 310, and 410 may detect neighbor macrocells, collect macrocell identifiers thereof, and generate cell information including the collected macrocell identifiers and a femtocell identifier associated therewith. Femtocell base stations 210, 310, and 410 my transmit the cell information to femtocell gateway 500.

Femtocell gateway 500 may receive the macrocell quality report information from at least one of femtocell base stations 210, 310, and 410. Femtocell gateway 500 may deliver the received macrocell quality report information to sever 600. Femtocell gateway 500 may receive the event information from server 600 and deliver the event information to at least one of femtocell base stations 210, 310, and 410. Femtocell gateway 500 may refer to the cell information to determine a destination of the event information.

Server 600 may generate the event information. For example, server 600 may set up the threshold information and the interval information and include the threshold information and the interval information in the event information. Server 600 may also include a macrocell identifier of a target macrocell when the target macrocell is designated. Server 600 may transmit the event information to femtocell gateway 500.

Server 600 may receive the macrocell quality report information from at least one of femtocell base stations 210, 310, and 410 and analyze the received macrocell quality report information. Server 600 may manage macrocell 100 and femtocells 200, 300, and 400 based on the analysis result.

Hereinafter, femtocell base station 210, femtocell gateway 500, and server 600 will be described with reference to FIG. 2 through FIG. 4, respectively. For convenience and ease of understanding, femtocell base station 210 may be described representatively. Femtocell base stations 310 and 410 may have a structure similar to that of femtocell base station 210 and operate in an analogous manner. Femtocell base station 210 may detect neighbor macrocells, measure macrocell quality of at least one detected macrocells, and transmit the measured quality of the at least one detected macrocell to femtocell gateway 500. Such base station 210 is illustrated in FIG. 2.

Figure 2:
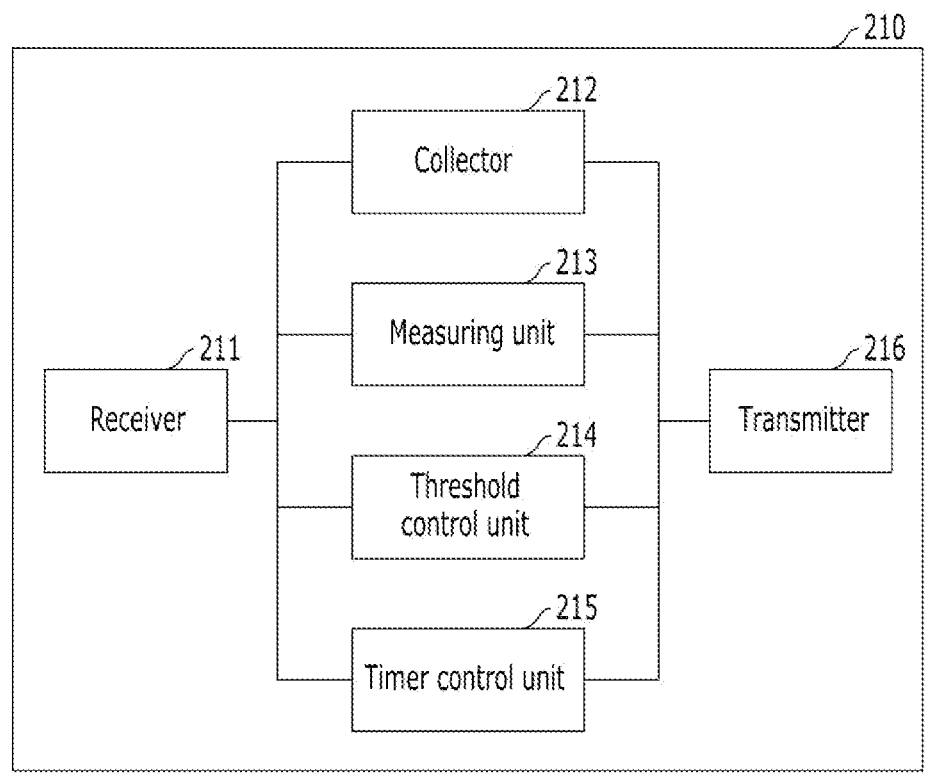
FIG. 2 shows a femtocell base station in accordance with an embodiment of the present invention.

FIG. 2 shows a femtocell base station in accordance with an embodiment of the present invention.

Referring to FIG. 2, femtocell base station 210 may include receiver 211, collector 212, measuring unit 213, threshold control unit 214, timer control unit 215, and transmitter 216.

Receiver 211 may scan and receive signals from neighbor cells including macrocell 100 and femtocells 300 and 400. For example, receiver 211 may be in a listening mode for scanning and receiving the signals. The signals may be pilot signals transmitted from neighbor base stations such as macrocell base station 110 and femtocell base stations 310 and 410. Such received signals may be used to collect cell identifiers of neighbor cells.

Receiver 211 may also receive event information from femtocell gateway 500. The event information may be generated by server 600 and delivered through femtocell gateway 500. The event information may include a macrocell identifier of a target macrocell, threshold information, and interval information.

Collector 212 may collect identifiers from at least one cell adjacent to femtocell base station 210 based on the received signals from neighbor cells. Particularly, collector 212 may collect macrocell identifiers of at least one macrocell adjacent to femtocell base station 210. Collector 212 may generate cell information to include the collected macrocell identifiers and femtocell identifiers associated with the collected macrocell identifiers. For example, collector 211 may collect a macrocell identifier of macrocell 100 that overlaps with femtocell 200 of femtocell base station 210 and generate cell information to include the collected macrocell identifier of macrocell 100 with the collected identifier of femtocell 200. The cell information may include information on macrocells and femtocells that can communicate with each other. Collector 211 may transfer the cell information to measuring unit 212 and transmitter 216.

Measuring unit 213 may measure macrocell quality of at least one macrocell adjacent to femtocell base station 210. For example, measuring unit 213 may measure macrocell quality of a macrocell indicated by a macrocell identifier included in the event information. Or, measuring unit 213 may measure macrocell quality of at least macrocell indicated by the collected macrocell identifier. The present invention, however, is not limited thereto. Measuring unit 213 may measure macrocell quality of all macrocells around femtocell base station 210.

Particularly, measuring unit 213 may determine whether the collected macrocell identifier is identical to a macrocell identifier included in the event information received from server 600. The collected macrocell identifier may be included in the cell information generated by collector 212. Server 600 may include the macrocell identifier of a target macrocell in the event information in order to measure macrocell quality of the target macrocell.

When the collected macrocell identifier is identical to the macrocell identifier in the event information, measuring unit 213 may measure macrocell quality of only a target macrocell indicated by the macrocell identifier included in the event information. When the collected macrocell identifier is not identical to the designated macrocell identifier, measuring unit 213 may measure macrocell qualities of all macrocells located near to femtocell base station 210.

The macrocell quality may be measured by measuring signal quality parameters of a macrocell. The signal quality parameter may include a SINR and/or a RSRP of macrocell 100. For example, one of signal quality parameters may be selected to represent overall quality of a macrocell. The selected signal quality parameter may be monitored and measured for measuring the macrocell quality, but the present invention is not limited thereto.

Furthermore, measuring unit 213 may generate macrocell quality report information to include the measured macrocell quality and transmit the generated macrocell quality report information through transmitter 216 based on the threshold information and the interval information included in the event information. For example, measuring unit 213 may compare the measured macrocell quality with at least one threshold values set up based on the threshold information. When the measured macrocell quality exceeds the at least one threshold, measuring unit 213 may transmit the generated macrocell quality report information to femtocell gateway 500 through transmitter 216. Furthermore, measuring unit 213 may regularly transmit the generated macrocell quality report information at a reporting interval set up based on the interval information.

Threshold control unit 214 may set up at least one threshold value based on the threshold information and the macrocell identifier, which are included in the received event information. Threshold control unit 214 may set up at least one threshold value for a signal quality parameter selected to be representatively measured as macrocell quality. For example, threshold control unit 214 may set up threshold values for a SINR and/or a RSRP when the SINR and/or the RSRP are measured for measuring the macrocell quality. The threshold values may include an upper limit value and a lower limit value. For some embodiments, when the measured macrocell quality is higher than the upper limit value or when the measured macrocell quality is lower than the lower limit value, the macrocell quality report information is transmitted. For other embodiments, the measured macrocell quality might be transmitted at regular intervals.

Timer control unit 215 may set up a timer based on the interval information in the event information. The interval information may include a reporting interval. The timer may be included in timer control unit 215 or may be an independent unit from timer unit 215. The macrocell quality report information may be regularly transmitted at the reporting interval by driving the timer.

Transmitter 216 may transmit the macrocell quality report information to femtocell gateway 500 based on the threshold information and the interval information included in the received event information. The macrocell quality report information may include information on the measured macrocell quality of the target macrocell. The threshold values may have two values, an upper limit value and a lower limit value. When the measured macrocell quality is lower than the lower limit value or when the measured macrocell quality is higher than the upper limit value, transmitter 216 may transmit the macrocell quality report information to femtocell gateway 500. Transmitter 216 may regularly transmit the macrocell quality report information at the reporting interval set up by interval setup unit 216.

Transmitter 216 may also transmit the cell information to femtocell gateway 500. The cell information may be prepared by collector 211 and include the collected macrocell identifiers of neighbor macrocells and femtocell identifiers associated with the macrocell identifiers.

Hereinafter, femtocell gateway 500 will be described with reference to FIG. 3. As described above, femtocell gateway 500 may be coupled with at least one of femtocell base stations 210, 310, and 410. Femtocell gateway 500 may receive event information from server 600 and transmit the received event information to at least one femtocell base stations 210, 310, and 410. Furthermore, femtocell gateway 500 may receive macrocell quality report information from at least one femtocell base stations 210, 310, and 410 and transmit the received macrocell quality report information to server 600.

Figure 3:
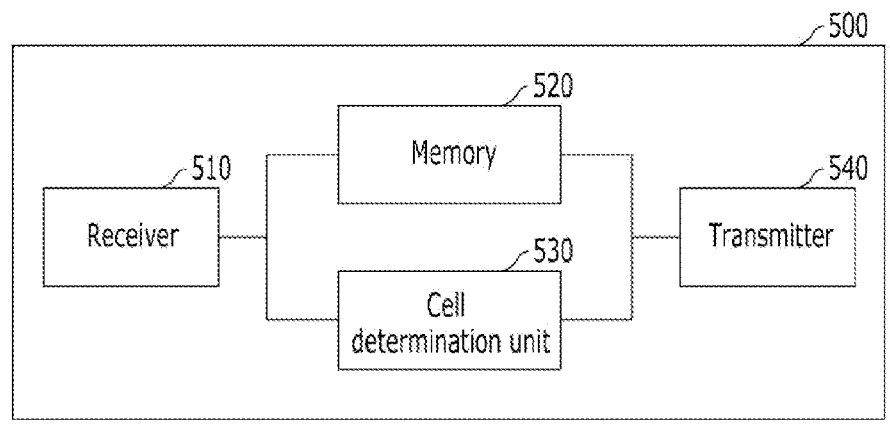
FIG. 3 shows a femtocell gateway in accordance with an embodiment of the present invention.

FIG. 3 shows a femtocell gateway in accordance with an embodiment of the present invention.

Referring to FIG. 3, femtocell gateway 500 may include receiver 510, memory 520, cell determination unit 530, and transmitter 540.

Receiver 510 may receive event information from server 600. The event information may include a macrocell identifier of a target macrocell, threshold information, and interval information. Receiver 510 may store the received event information in event information memory 540.

Receiver 510 may regularly receive cell information from at least one femtocell base station 210, 310, and 410 coupled to femtocell gateway 500. Receiver 510 may store the received cell information in memory 520. The cell information may include information on microcell identifiers and associated femtocell identifiers. For example, the cell information may include information on neighbor cells that can be communicated with each other. That is, the cell information may include information on macrocell 100 adjacent to femtocell base stations 210, 310, and 410 coupled to femtocell gateway 500.

Receiver 510 may receive macrocell quality report information from the at least one femtocell base station 210, 310, and 410 coupled to femtocell gateway 500. Receiver 510 may store the received macrocell quality report information in memory 520.

Memory 520 may store the event information received from server 600 and the cell information and the macrocell quality report information, which are received from the at least one femtocell base station 210, 310, and 410 coupled to femtocell gateway 500. Memory 520 may provide the event information, the cell information, and the macrocell quality report information to cell determination unit 530 and/or transmitter 540.

Cell determination unit 530 may determine a target macrocell to measure macrocell quality and a target femtocell base station that can measure macrocell quality of the target macrocell. Cell determination unit 530 may refer to the event information to determine the target macrocell. Cell determination unit 530 may refer to the cell information to determine the target femtocell base station. The cell information and the event information may be stored in memory 520.

For example, cell determination unit 530 may determine whether a macrocell identifier is included in the event information received from server 600. When the received event information includes the macrocell identifier, cell determination unit 530 may determine a macrocell indicated by the macrocell identifier included in the received event information, as the target macrocell.

Furthermore, cell determination unit 530 may determine the target femtocell base station based on the cell information when the received event information includes the macrocell identifier. Particularly, cell determination unit 530 may determine whether there is a femtocell base station capable of measuring macrocell quality of the target macrocell. In order to determine the target femtocell base station, cell determination unit 530 may determine whether the cell information includes a femtocell identifier associated with the target macrocell. Cell determination unit 530 may refer to the cell information stored in the memory 520. The cell information may include information on a femtocell identifier associated with a corresponding macrocell identifier. That is, the cell information may include information on at least one femtocell base station that can communicate with the target macrocell.

Transmitter 540 may transmit the event information received from server 600 to the target femtocell base station determined by cell determination unit 530. For example, when cell determination unit 500 determines that macrocell 100 is determined as the target macrocell and femtocell base station 210 is determined as the target femtocell base station, transmitter 530 may transmit the event information to target femtocell base station 210. Based on the event information, target femtocell base station 210 may measure macrocell quality of macrocell 100.

Transmitter 540 may transmit the event information to all femtocell base stations that are coupled with femtocell gateway 500. For example, transmitter 540 may transmit the event information to all femtocell base stations when cell determination unit 530 is unable to determine the target macrocell and/or the target femtocell base station because i) the event information does not include a macrocell identifier ii) and/or the cell information does not include at least one femtocell identifier associated with a macrocell identifier included in the event information. In this case, transmitter 540 may transmit the event information to all femtocell base stations connected to femtocell gateway 500. For example, the event information may be transmitted to femtocell base stations 210, 310, and 410, which are coupled to femtocell gateway 500. Based on the event information, femtocell base stations 210, 310, and 410 may measure macrocell quality of substantially all neighbor macrocells.

Transmitter 540 may also deliver the macrocell quality report information from at least one femtocell base stations 210, 310, and 410 to server 600.

Hereinafter, server 600 will be described with reference to FIG. 4. As described above, server 600 may receive the macrocell quality of at least one macrocell through femtocell gateway 500 and analyze the received macrocell quality.

Figure 4:
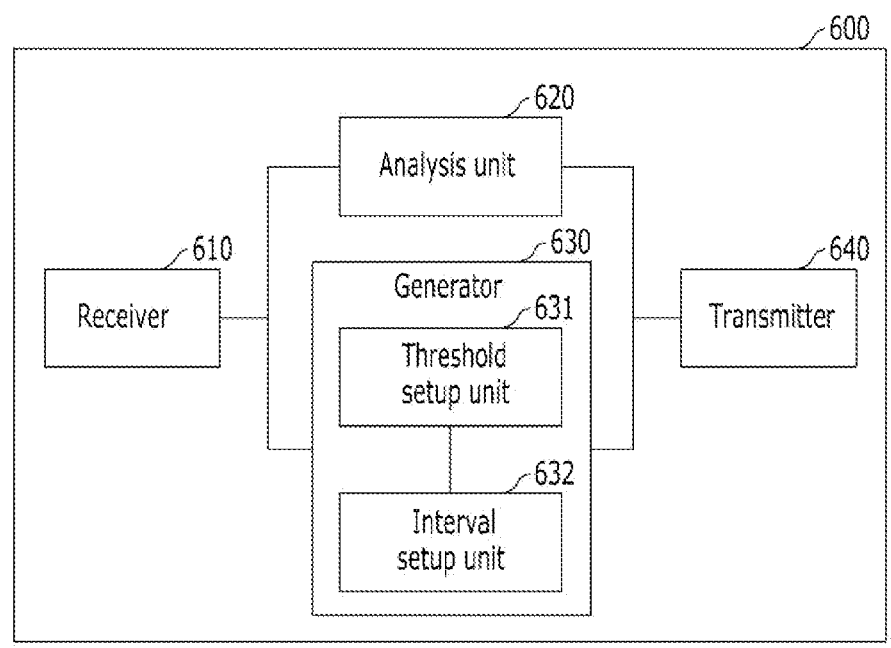
FIG. 4 illustrates a server in accordance with an embodiment of the present invention.

FIG. 4 illustrates a server in accordance with an embodiment of the present invention.

Referring to FIG. 4, server 600 may be coupled with femtocell gateway 500. Server 600 may include receiver 610, analysis unit 620, generator 630, and transmitter 640. Generator 630 may include threshold setup unit 631 and interval setup unit 632.

Receiver 610 may receive macrocell quality report information from information transceiver 550 of femtocell gateway 500.

Analysis unit 620 may analyze the received macrocell quality report information from at least one of femtocell base stations 210, 310, and 410 through femtocell gateway 500. The macrocell quality report information may include macrocell quality of macrocell 100, which may be measured by at least one of femtocell base stations 210, 310, and 410. Based on the analysis result, analysis unit 620 may determine whether analysis unit 620 desirably manages the related macrocell and at least one of femtocell base stations 210, 310, and 410. For example, analysis unit 620 may detect a failure status in the related macrocell, such as, but not limited to, signal transmission failure, signal reception failure, or handoff failure. When analysis unit 620 determines that the detected failure status seriously degrades overall performance of the related macrocell, analysis unit 620 may request a corresponding management server (not shown) to manage the related macrocell. For example, signal transmission power and locations of related macrocell base station and femtocell base stations may be controlled externally to the system shown.

Generator 630 may generate event information including threshold information and reporting interval information. For example, generator 630 may include threshold setup unit 631 and interval setup unit 632.

Threshold setup unit 631 may generate threshold information by setting up a threshold according to at least one signal quality parameter assigned to represent macrocell quality. For example, the at least one signal quality parameter may include a SINR and a RSRP, but the present invention is not limited thereto. The RSRP may denote power of a signal received at a femtocell base station from a macrocell base station. The SINR may denote an interference level and a noise level of a macrocell, interfered by signals from at least one neighbor femtocell.

Interval setup unit 632 may set up a reporting interval and generate interval information. The reporting interval may be an interval for at least one of femtocell base stations 210, 310, and 410 to transmit macrocell quality report information to server 600 through femtocell gateway 500. Interval setup unit 632 may differently set up reporting intervals according to each signal quality parameter, but the present invention is no limited thereto. The reporting interval may be set up identically for all signal quality parameters, or may be modified so as to report more often for rapidly changing or more important signal quality parameters, and less often for slowly varying or less important signal quality parameters.

Generator 630 may generate the event information to include the threshold information and the interval information. Furthermore, generator 630 may include a macrocell identifier of a target macrocell in the event information when a certain macrocell is designated for measuring macrocell quality thereof.

Transmitter 640 may transmit the generated event information to femtocell gateway 500.

Hereinafter, a method for measuring macrocell quality of a macrocell using femtocells in accordance with an embodiment of the present invention will be described with reference to FIG. 5. For convenience and ease of understanding, the method will be described as that femtocell base station 210 measures macrocell quality of macrocell 100. The present invention, however, is not limited thereto.

Figure 5A:
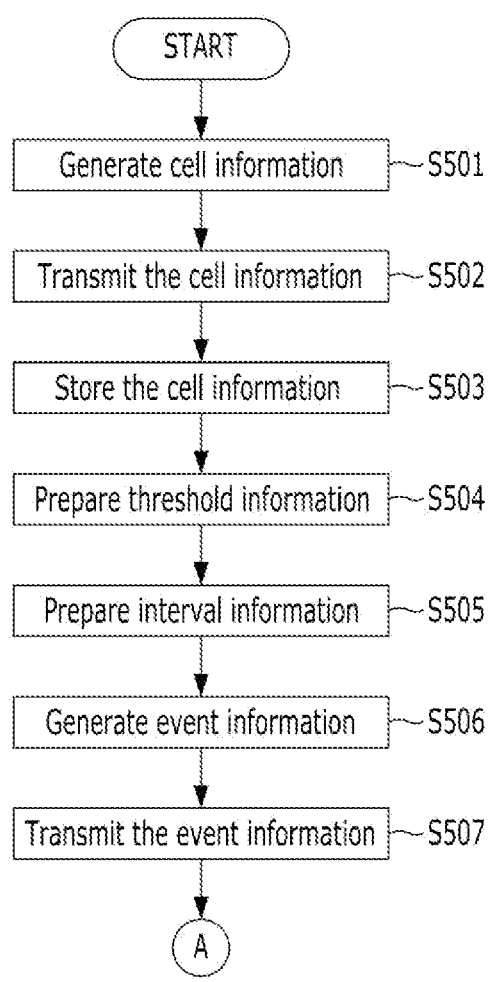
FIG. 5A and FIG. 5B show a method for measuring macrocell quality using femtocells accordance with an embodiment of the present invention.
Figure 5B:
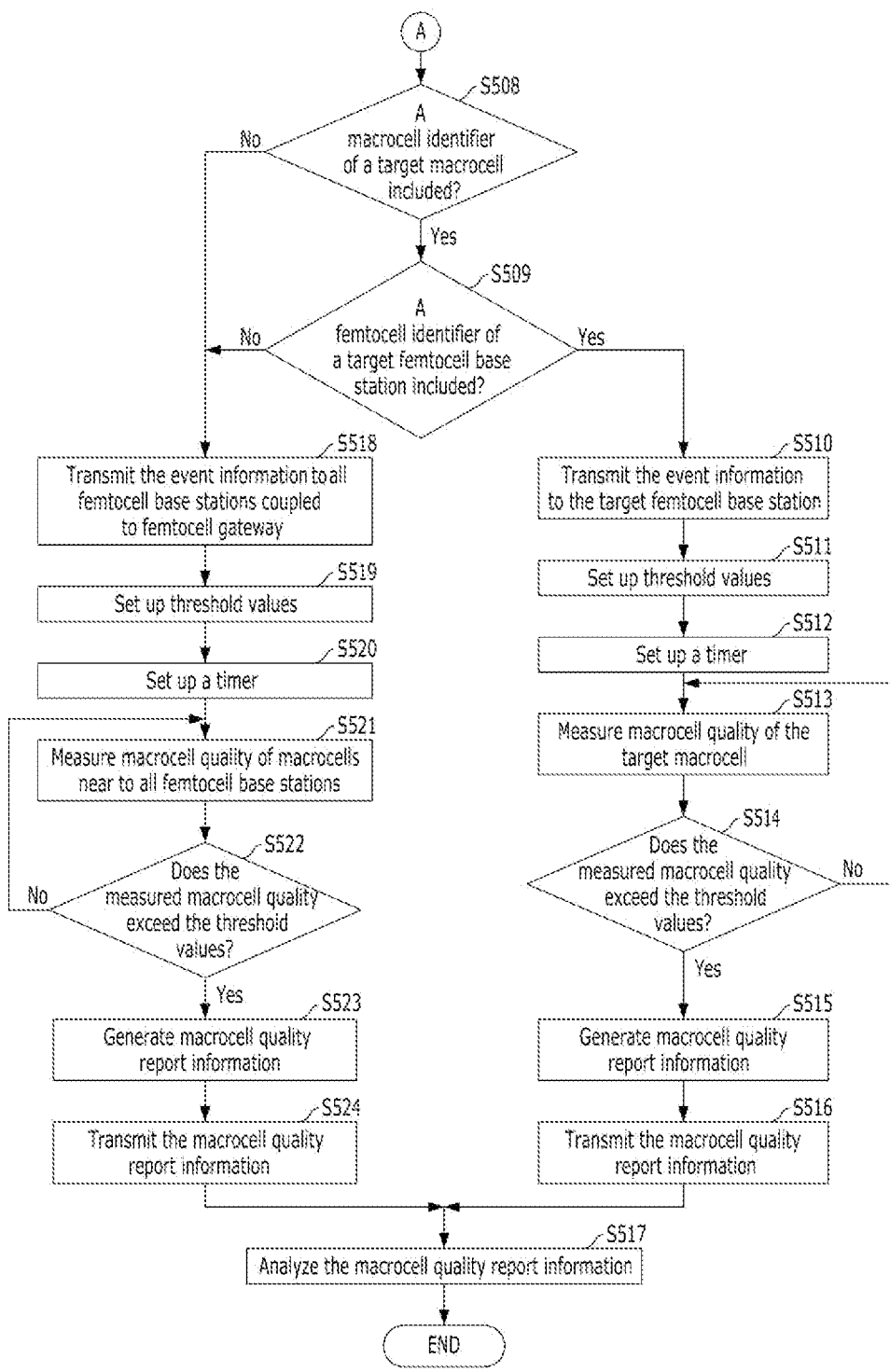

FIG. 5A and FIG. 5B show a method for measuring macrocell quality using femtocells in accordance with an embodiment of the present invention.

Referring to FIG. 5A and FIG. 5B, cell information may be generated at step S501. For example, at least one macrocell identifier of neighbor macrocells may be collected and the cell information may be generated to include the collected at least one macrocell identifier with an associated femtocell base station. Particularly, collector 212 of femtocell base station 210 may collect a macrocell identifier of macrocell 100 adjacent to femtocell base station 210 and generate the cell information with the collected macrocell identifier and a femtocell identifier of femtocell 200.

The cell information may be transmitted to femtocell gateway 500 at step S502. For example, transmitter 216 of femtocell base station 210 may transmit the cell information to femtocell gateway 500.

The cell information may be stored in femtocell gateway 500 at step S503. For example, femtocell gateway 500 may receive the cell information from transmitter 216 of femtocell base station 210 and store the received cell information in memory 530. The steps S501 to S503 may be regularly performed at certain predefined intervals. Accordingly, macrocells near to at least one femtocell base stations coupled to a femtocell gateway may be regularly detected. For example, femtocell gateway 500 may be aware of macrocell 100 located around femtocell base stations 210, 310, and 410 based on the cell information.

At step S504, threshold information may be prepared. For example, threshold setup unit 631 of server 600 may set up a threshold according to at least one signal quality parameter assigned to represent macrocell quality and generate the threshold information.

At step S505, interval information may be prepared. For example, interval setup unit 632 may set up a reporting interval and generate interval information. The reporting interval may be an interval for at least one of femtocell base stations 210, 310, and 410 to transmit macrocell quality report information to server 600 through femtocell gateway 500 when measured macrocell quality exceeds threshold values set up based on the threshold information. The macrocell quality report information may be regularly transmitted to server 600 at the report interval when the measured macrocell quality exceeds the setup threshold. The report interval may be identically or differently set up according to the signal quality parameters as previously described.

At step S506, event information may be generated. For example, generator 630 may generate the event information including the threshold information and the interval information. Furthermore, generator 630 may include a macrocell identifier of a target macrocell in the event information when a certain macrocell is designated for measuring macrocell quality thereof.

At step S507, the event information may be transmitted to femtocell gateway 500. For example, transmitter 640 may transmit the event information to femtocell gateway 500. The steps S504 to S507 may be performed concurrently or simultaneously with the step S501 to S503, but the present invention is not limited thereto.

At step S508, determination may be made as to whether a macrocell identifier of a target macrocell is included in the event information. For example, cell determination unit 520 of femtocell gateway 500 may determine whether a macrocell identifier is included in the event information.

When the macrocell identifier of the target macrocell is included in the event information (Yes-S508), determination may be made as to whether a femtocell identifier associated to a femtocell base station capable of measuring macrocell quality of the target macrocell is included in cell information at step S509. The femtocell cell base station capable of measuring macrocell quality may be referred to as a target femtocell base station.

When the femtocell identifier associated with the target femtocell base station is included in the cell information (Yes-S509), the event information may be transmitted to the target femtocell base station at step S510. For convenience and ease of understanding, it is assumed that the target femtocell base station is femtocell base station 210 and the target macrocell is macrocell 100. Accordingly, the event information may be transmitted to femtocell base station 210.

At step S511, threshold values may be set up based on the threshold information included in the event information upon the receipt of the event information. For example, threshold control unit 214 of femtocell base station 210 may set up at least one threshold value including an upper limit value and a lower limit value based on the threshold information and the macrocell identifier of target macrocell 100.

At step S512, a timer may be set up based on the interval information included in the event information. For example, timer control unit 215 of femtocell base station 210 may set up the timer based on the reporting interval included in the interval information.

At step S513, macrocell quality of the target macrocell may be measured. For example, measuring unit 213 of femtocell base station 210 may measure the macrocell quality of macrocell 100 indicated by the macrocell identifier included in the event information.

At step S514, determination may be made as to whether the measured macrocell quality exceeds the threshold values. For example, femtocell base station 210 may compare the measured macrocell quality with the threshold values.

When the measured macrocell quality exceeds the threshold values (Yes-S514), macrocell quality report information may be generated at step S515. For example, femtocell base station 210 may generate the macrocell quality report information to include the measured macrocell quality.

When the measured macrocell quality does not exceed the threshold values (No-S514), macrocell quality of the target macrocell may be continuously measured at step S513.

At step S516, the macrocell quality report information may be transmitted. For example, transmitter 216 of femtocell base station 216 may regularly transmit the macrocell quality report information to server 600 through femtocell gateway 500 at the report interval.

At step S517, a related macrocell may be analyzed based on the macrocell quality report information. For example, server 600 may receive the macrocell quality report information of the target macrocell such as macrocell 100. Server 600 may analyze the macrocell quality of macrocell 100. Based on the analysis result, analysis unit 620 of server 600 may determine whether it is required to manage macrocell 100 and at least one of femtocell base stations 210, 310, and 410. For example, when analysis unit 620 determines that the macrocell quality is seriously degraded, analysis unit 620 may request a corresponding management server (not shown) to manage the related macrocell. For example, signal transmission power and locations of related macrocell base station and femtocell base stations may be controlled.

Referring back to the step S508, the macrocell identifier of the target macrocell may not be necessarily included in the event information (No-S508) and/or the femtocell identifier associated with the target femtocell base station may not necessarily be included in the cell information (No-S509). In these cases, the event information may be transmitted to all femtocell base stations coupled to femtocell gateway 500 at step S518. Accordingly, following steps may be performed at substantially all femtocell base stations 210, 310, and 410, coupled to femtocell gateway 500.

At step S519, threshold values may be set up based on the threshold information included in the event information at all femtocell base stations. At step S520, a timer may be set up based on the interval information included in the event information at all femtocell base stations. At step S521, macrocell quality of macrocells near to a corresponding femtocell base station may be measured. For example, femtocell base stations 210, 310, and 410 may measure macrocell quality of at least one macrocell adjacent thereto.

At step S522, determination may be made as to whether the measured macrocell quality exceeds the threshold values. When the measured macrocell quality exceeds the threshold values (Yes-S522), macrocell quality report information may be generated at step S523. When the measured macrocell quality does not exceed the threshold values (No-S524), macrocell quality of the at least one macrocell may be continuously measured at step S521.

At step S524, the macrocell quality report information may be transmitted. For example, femtocell base stations 210, 310, and 410 may regularly transmit the macrocell quality report information to server 600 through femtocell gateway 500 at the report interval.

At step S517, related macrocell may be analyzed based on the macrocell quality report information.

As described above, macrocell quality may be measured through femtocells. Since an additional system or server is not required to measure quality of a macrocell, a cost for managing heterogeneous network may be reduced.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for measuring macrocell quality of at least one macrocell using a femtocell base station, the method comprising:

measuring, by the femtocell base station, macrocell quality of at least one macrocell based on event information;

generating macrocell quality report information based on a result of the measuring; and transmitting the generated macrocell quality report information to a server through a femtocell gateway, wherein the measuring macrocell quality includes:

measuring the macrocell quality of a target macrocell corresponding to a macrocell identifier included in the event information when the macrocell identifier is present in the event information, and wherein the generating macrocell quality report information includes:

initiating at least one threshold value based on threshold information included in the event in formation, determining whether the measured macrocell quality reaches the initiated at least one threshold value, and generating the macrocell quality report information by including the measured macrocell quality when the measured macrocell quality reaches the at least one threshold value.

2. The method of claim 1, wherein the measuring macrocell quality includes:

determining whether the macrocell identifier is present in the event information;

measuring the macrocell quality of the target macrocell corresponding to the macrocell identifier of the event information when the macrocell identifier is present in the event information; and measuring the macrocell quality of substantially all neighbor macrocells when the macrocell identifier is absent from the event information.

3. The method of claim 1, wherein, for the measuring macrocell quality, at least one signal quality parameter of the at least one macrocell is measured.

4. The method of claim 3, wherein the signal quality parameter is at least one of a signal-to-interference plus noise ratio (SINR) and a reference signal received power (RSRP).

5. A method for measuring macrocell quality of at least one macrocell using a femtocell base station, the method comprising:

measuring, by the femtocell base station, macrocell quality of at least one macrocell based on event information;

generating macrocell quality report information based on a result of the measuring; and transmitting the generated macrocell quality report information to a server through a femtocell gateway, wherein the transmitting the generated macrocell quality report information includes:

initiating a timer based on interval information included in the event information; and regularly transmitting the generated macrocell quality report information to the server through the femtocell gateway based on a value of the timer.

6. The method of claim 1, prior to the measuring macrocell quality, at the server, further comprising:

generating the event information by including at least one of threshold information, interval information, and the macrocell identifier of the target macrocell; and transmitting the generated event information to the femtocell gateway.

7. The method of claim 6, at the femtocell gateway, further comprising:

receiving the event information from the server;

determining whether the macrocell identifier of the target macrocell is present in the received event information;

determining whether a femtocell identifier of a target femtocell base station capable of measuring the target macrocell is present in cell information;

transmitting the event information to the target femtocell base station when the macrocell identifier is present in the event information and the femtocell identifier of the target femtocell base station is present in the cell information; and transmitting the event information to substantially all femtocell base stations coupled to the femtocell gateway when the macrocell identifier is absent in the event information and when the femtocell identifier is absent in the cell information.

8. The method of claim 7, prior to the measuring macrocell quality, at femtocell base stations coupled to the femtocell gateway, comprising:

scanning and receiving signals transmitted from at least one neighbor macrocell in a listening mode;

collecting the macrocell identifier of the at least one neighbor macrocell based on the received signals;

generating the cell information by including the collected macrocell identifier and a femtocell identifier associated with the collected macrocell identifier; and transmitting the cell information to the femtocell gateway.

9. A femtocell base station comprising:

a measuring unit configured to measure macrocell quality of at least one macrocell based on event information and to generate macrocell quality report information based on the measuring result, wherein the measuring unit measures the macrocell quality of a target macrocell corresponding to a macrocell identifier included in the event information;

a transmitter configured to transmit the generated macrocell quality report information to a server through a femtocell gateway; and a timer control unit configured to initiate a timer based on interval information present in the event information, wherein the transmitter regularly transmits the generated macrocell quality report information to the server through the femtocell gateway based on a value of the timer.

10. The femtocell base station of claim 9, wherein the measuring unit is configured to:

determine whether the macrocell identifier is present in the event information;

measure the macrocell quality of the target macrocell indicated by the macrocell identifier present in the event information when the macrocell identifier is present in the event information; and measure the macrocell quality of substantially all neighbor macrocells when the macrocell identifier is absent from the event information.

11. The femtocell base station of claim 9, wherein at least one signal quality parameter of the at least one macrocell is measured for measuring the macrocell quality of the at least one macrocell.

12. The femtocell base station of claim 11, wherein the signal quality parameter includes at least one of a signal-to-interference plus noise ratio (SINR) and a reference signal received power (RSRP).

13. The femtocell base station of claim 9, further comprising:

a threshold control unit configured to set up at least one threshold value based on threshold information included in the event information, wherein if the measured macrocell quality reaches the at least one threshold value, the macrocell quality report information is generated including the measured macrocell quality.

14. The femtocell base station of claim 9, the server comprising:

a generator configured to generate the event information by including at least one of threshold information, interval information, and a macrocell identifier of a target macrocell; and a transmitter configured to transmit the generated event information to the femtocell gateway.

15. The femtocell base station of claim 14, wherein the server includes:
- a threshold setup unit configured to set up at least one threshold value corresponding to signal quality parameters and to generate threshold information by including the set up at least one threshold value; and
- an interval setup unit configured to set up a report interval and to generate interval information by including the set up report interval,
- wherein the signal quality parameter is selected and set up to be representatively measured for measuring the macrocell quality.

16. The femtocell base station of claim 14, wherein the femtocell gateway includes:
- a receiver configured to receive the event information from the server and to receive cell information from femtocell base stations coupled to the femtocell gateway;
- a cell determination unit configured to determine whether the macrocell identifier of the target macrocell is included in the received event information and to determine whether a femtocell identifier of a target femtocell base station capable of measuring the target macrocell is included in the cell information; and
- a transmitter configured to transmit the event information to the target femtocell base station when the macrocell identifier is present in the event information and when the femtocell identifier of the target femtocell base station is present in the cell information and to transmit the event information to all femtocell base stations coupled to the femtocell gateway when the macrocell identifier is absent from the event information and when the femtocell identifier is absent from the cell information.

17. The femtocell base station of claim 16, further comprising:
- a collector configured to collect a macrocell identifier of the at least one neighbor macrocell and to generate the cell information by including the collected macrocell identifier and a femtocell identifier associated with the collected macrocell identifier,
- wherein the transmitter is configured to transmit the cell information to the femtocell gateway.

18. The femtocell base station of claim 17, wherein:
- the receiver is configured to scan and to receive signals transmitted from at least one neighbor macrocell in a listening mode; and
- the collector is configured to detect the macrocell identifier of the at least one neighbor macrocell based on the scanned signals.

* * * * *